United States Patent [19]

Young et al.

[11] Patent Number: 5,280,575
[45] Date of Patent: * Jan. 18, 1994

[54] APPARATUS FOR CELL FORMAT CONTROL IN A SPREAD SHEET

[75] Inventors: Carol A. Young; Neal F. Jacobson, both of Nashua, N.H.

[73] Assignee: Digital Equipment Corporation, Maynard, Mass.

[*] Notice: The portion of the term of this patent subsequent to Dec. 29, 2009 has been disclaimed.

[21] Appl. No.: 838,352

[22] Filed: Feb. 19, 1992

Related U.S. Application Data

[62] Division of Ser. No. 368,697, Jun. 19, 1989, Pat. No. 5,175,810.

[51] Int. Cl.$^5$ .............................................. G06F 5/00
[52] U.S. Cl. ................................. 395/148; 395/700; 364/DIG. 2; 364/943; 364/943.44
[58] Field of Search ............ 264/DIG.; 395/800, 700, 395/109, 110, 148

[56] References Cited

U.S. PATENT DOCUMENTS

| | | | |
|---|---|---|---|
| 4,633,430 | 12/1986 | Cooper | 395/600 |
| 4,679,137 | 7/1987 | Lane et al. | 364/188 |
| 4,713,754 | 12/1987 | Agarwal et al. | 395/600 |
| 4,833,594 | 5/1989 | Familetti et al. | 364/200 |
| 4,864,497 | 9/1989 | Lowry et al. | 364/300 |
| 4,905,138 | 2/1990 | Bourhe | 364/200 |
| 4,959,769 | 9/1990 | Cooper et al. | 364/200 |
| 5,001,697 | 3/1991 | Torres | 364/521 |
| 5,021,973 | 6/1991 | Hernandez et al. | 364/518 |
| 5,033,008 | 7/1991 | Barker et al. | 364/523 |
| 5,033,009 | 7/1991 | Dubnoff | 364/523 |
| 5,055,998 | 10/1991 | Wright et al. | 395/800 |
| 5,101,493 | 3/1992 | Tarvis et al. | 395/700 |
| 5,119,465 | 6/1992 | Jack et al. | 395/500 |
| 5,119,491 | 6/1992 | Iwai et al. | 395/600 |

OTHER PUBLICATIONS

Paul A. Sand, *Advanced Programming Techniques*, Osborne/McGraw-Hill, Berkeley, California, (1984), pp. 246–341.

Primary Examiner—Thomas C. Lee
Assistant Examiner—John C. Loomis
Attorney, Agent, or Firm—Arnold, White & Durkee

[57] ABSTRACT

A data structure for tabular data arranged in rows and columns. The data structure includes a header portion including a generic columnar processing information table, and a data portion for storing data in rows, the data portion further identifying a table containing generic columnar processing information to be used in processing selected cells in the row. In a refinement, each row in the data structure includes a row header including a row number and at least one cell, the row number identifying a row in a table for the cell. As a further refinement, each cell includes a header portion and a value portion, the header portion containing a cell number identifying a column in a table for the cell.

20 Claims, 6 Drawing Sheets

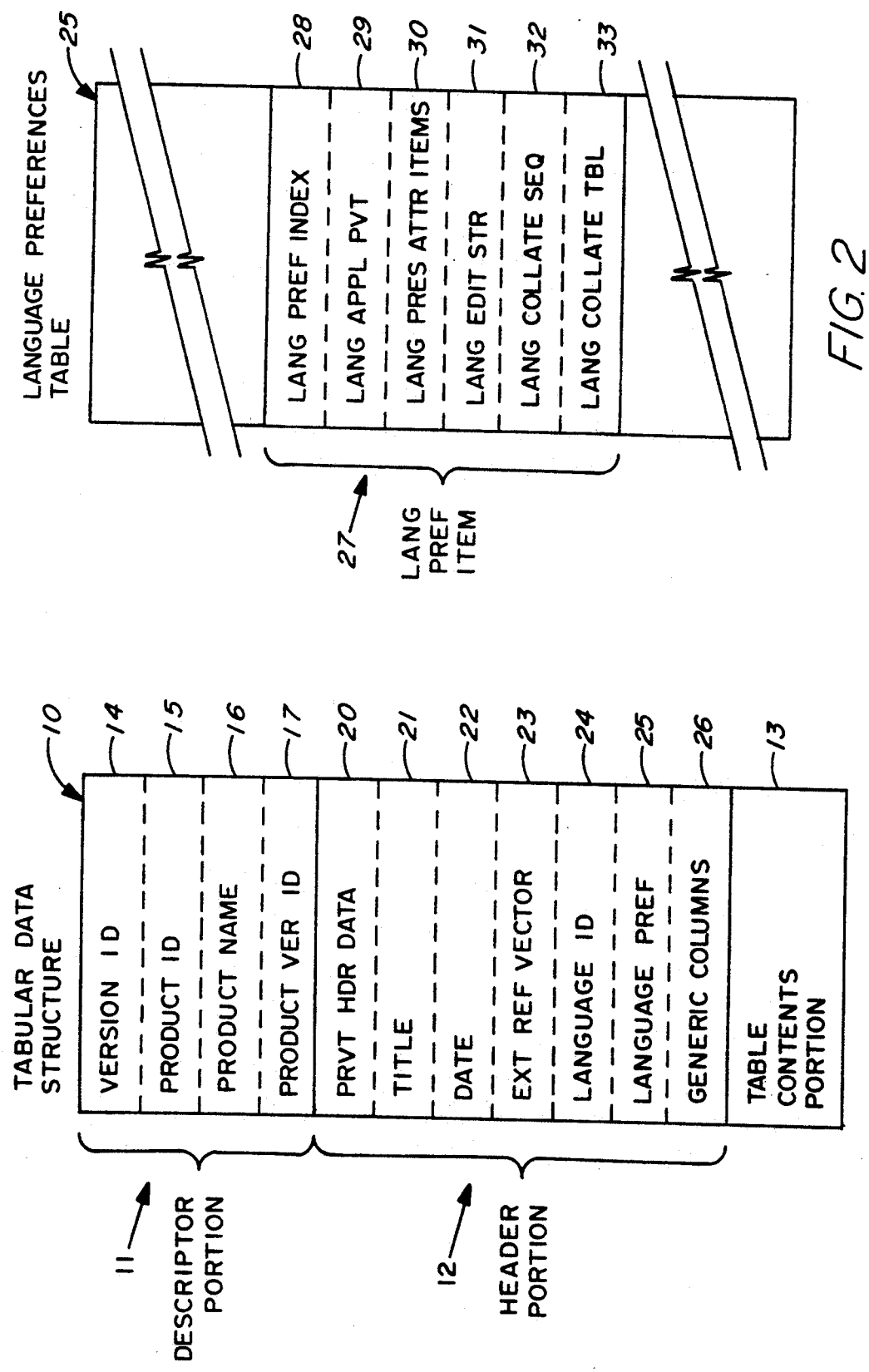

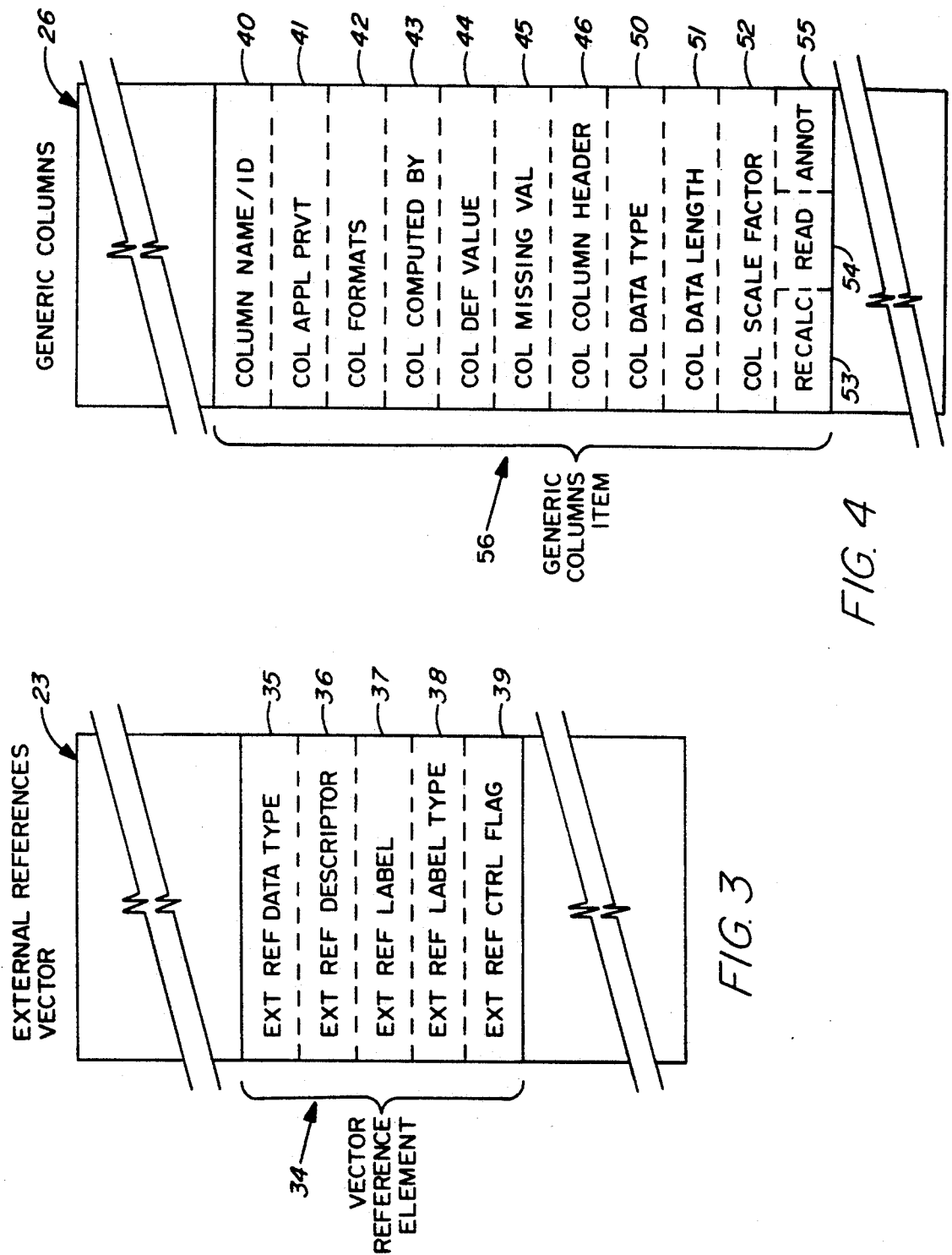

APPARATUS FOR CELL FORMAT CONTROL IN A SPREAD SHEET

This application is a divisional of application Ser. No. 07/368,697, filed Jun. 19, 1989, now U.S. Pat. No. 5,175,810

FIELD OF THE INVENTION

The invention relates generally to the field of digital computer systems, and more particularly to a data structure for organizing data that is particularly useful for use in connection with tabular data.

BACKGROUND OF THE INVENTION

In a digital computer system, computer programs provided by a number of vendors typically organize data for processing in a number of diverse formats. Each vendor may use different formats for organizing the data processed by its programs, with the formats being selected to enhance the processing by the particular program. Some programs may also include conversion routines which allow the program to import data from files having selected formats to a format used by the program, and to export data from the format used by the program to another format.

SUMMARY OF THE INVENTION

The invention provides a new and improved data structure for storing data relating to, for example, tables and similar items.

In brief summary, the invention provides, in one aspect, a data structure for tabular data arranged in rows and columns. The data structure includes a header portion including a generic columnar processing information table, and a data portion for storing sets of data in rows, the data portion further identifying a table containing columnar processing information to be used in processing selected cells in the rows in the table. In a refinement, each row in the data structure includes a row header including, implicity or explicity, a row number and at least zero or more cells, the row number identifying a row in a table for the cell. As a further refinement, each cell includes a header portion and a value portion, the header portion containing a cell number identifying a column in a table for the cell.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 1, 2, 3, 4, 5A, 5B, 5C and 5D depict data structures, at various levels of detail, of a tabular data structure in accordance with the invention;

DETAILED DESCRIPTION OF AN ILLUSTRATIVE EMBODIMENT

Figure 5B:
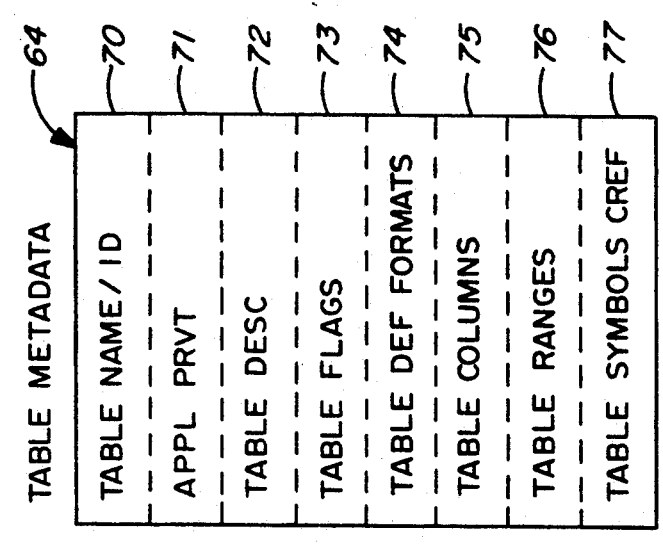
Figure 5A:
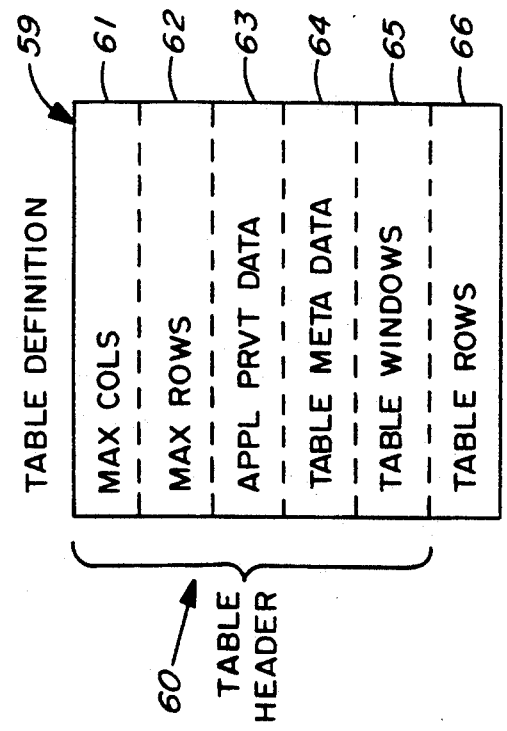

FIGS. 1 through 5D depict, at various level of detail, a tabular data structure in accordance with the invention. With reference to FIG. 1, a tabular data structure 10 includes three primary portions, including a descriptor portion 11, a header portion 12 and a table contents portion 13. As will be described in greater detail below in connection with FIGS. 5A through 5C, the table contents portion 13 contains, in one or more data structures each representing a table, data representing a table, which comprises an array of cells. Tabular data may be generated by, for example, a spreadsheet program in which data organized in the form of an array of, generally, two or more dimensions. The data stored in cells in a table may comprise literal data, that is, data representing input by an operator or other source, or it may comprise data representing a formula which defines a cell value in terms of an arithmetic expression with reference to other cells in the table. Alternatively, as described below, data for a cell may be represented or provided by a source external to the tabular data structure 10.

The descriptor portion 11 includes a plurality of fields, including a format version identification field 14 that identifies a format version for the tabular data structure 10, a product identification field 15 that receives a product identification value that identifies the product that created the particular tabular data structure 10, and a product name field 16 that receives a human-readable identifier for the product that created the particular tabular data structure 10. In addition, a product version field 17 receives a value identifying the version of the product identified in fields 15 and 16 that created the tubular data structure 10. The product identification in field 15 permits a user to select a file comprising the tabular data structure, and the computer control program may use the contents of field 15 to identify the application program that created the structure, call that application program, and enable the application program to use the data structure.

The header portion 12 also includes a plurality of fields, including a field 20 that receives private header information, that is, header information that is generated specifically and uniquely by the application program that generated the tabular data structure 10 and may not be cognizable by other applications which may use the particular tabular data structure 10. In addition, the header portion 12 includes a title field 21 which contains a title for the tabular data structure 10 and a data field 22 which contains a date identifying when the tabular data structure was created or last modified or updated.

In addition, if the tabular data structure 10 incorporates other data or data structures by reference, the header portion 12 includes an external references vector field 23 which stores an external reference vector, which will be described in further detail below in connection with FIG. 3. Briefly, the external reference vector includes one or more external reference entries, each identifying external information that is incorporated by reference into a table or cell in the tabular data structure 10. A table or cell in the table contents portion 13 may identify one of the entries in external reference vector 23, and in processing of the tabular data structure 10, for example during updating of a spreadsheet or creation of a printed table, the information from the referenced external structure is used to create the table or cell referencing, through the external references vector 23, the external data structure.

The header portion also may include a language identification field 24, which contains a value that identifies one or more natural languages which may be contained in text fields in the tabular data structure 10, a language preference table field 25 and a generic columns field 26. The natural languages identified in the language identification field 24 may also be used in connection with processing of the data values which may be contained in the table data structure. For example, the identified natural languages may be used to control sorting of data so that the data is sorted according to a language collating sequence. In addition, if data represents money, the identified natural languages may identify currency denominations and thus may be used to control processing of the currency values in the table.

The language preferences field 25, if present, contains one or more language preference items 27, each of which contains information relating to the formatting and processing of the tabular data in the table contents portion 13. In particular, a language preference item 27 includes a language preference index field 28 which is a pointer into a list of languages contained in language identification field 24 to thereby associate the item with the language, in language identification field 24, identified by the pointer. A language application private data field 29 may contain information that is private to the application that generated the tabular data structure 10 or that last updated its contents. A language presentation attribute items field 30 may contain a list of one or more information formatting items, such as a currency symbol indicator, where the currency symbol is located in relation to the currency value, digit separators and where they are located, and so forth. A language edit strings field 31 may contain such information as how types of data, such as money and telephone numbers, are to be formatted. A collating sequence field 32 may contain a value that identifies a predefined collating or sorting sequence which may identify a predefined collating sequence, and a collating table 33 may specify a customized collating sequence.

The generic columns field 26, which will be described in greater detail below in connection with FIG. 4, details information for processing and displaying columns in the various tables. The generic columns field 26 includes a plurality of entries. As will be described below in connection with FIG. 5B, the table contents portion 13 includes one or more table definitions each of which may, in turn, include a metadata portion, which, in turn, includes column entries each of which contains information regarding processing and display of a specific column of data in the table. A column entry in the metadata portion of a table may point to an entry in the generic columns field 26 too, and, if so, the information in the entry in the generic columns field 26 that is not inconsistent with or superseded by the information in the column entries in the metadata portion of the table will be used in processing or displaying the column of data in the table.

As noted above, the header portion 12 includes an external references vector 23 that identifies sources of data, external to the tabular data structure 10, that are incorporated into tables or cells in the tables in the tables contents portion 13. The external references vector 23 includes a plurality of vector reference elements 34, which is depicted in detail in FIG. 3, each of which contains a plurality of fields that identify an external data structure. The tables and cells that incorporate the external data by reference contain an index into the external references vector 23 identifying a particular vector reference element 34. During processing, printing, or transferring among, for example, nodes or hosts in a distributed digital data processing system of the tabular data structure referencing the vector reference element 34, the application performing the processing, printing, or transferring may obtain the necessary data for the table or cell from the external data structure identified by the element 34. One system for transferring a tabular data structure 10 containing an external references vector 23 is described in U.S. patent application Ser. No. 07/368,681 filed Jun. 19, 1989 of Robert L. Travis, et al., entitled Information Object Transport System filed on even date herewith.

With reference to FIG. 3, an item 34 in the external references vector 23 includes a number of fields. In particular, the external reference item 34 includes a reference data type field 35 and an external reference descriptor field 36 The contents of the external reference data type field 35 identifies the data type of the information provided by the externally referenced element. The contents of the external reference descriptor field 36 contain human-readable descriptor of the data type contained in field 35.

The external reference vector item 34 also includes an external reference label field 37 and an external reference label type field 38. The external reference label field 37 stores a value that identifies the data structure incorporated by reference. The external reference label type field 38 stores a value that identifies the type of label stored in field 37. In particular, the reference label field 37 stores a value corresponding to the name of the referenced data structure. In one embodiment, referenced external data structures may comprise files, maintained by the computer's operating system of the computer that created the tabular data structure 10, with each file being named according to a naming convention maintained by the operating system. In addition, external data structures may be stored in a record management system, essentially comprising records maintained by the record management system, with each record being named according to a naming convention maintained by the record management system. The reference label field 37 stores the file or record name of the referenced data structure, and the reference label type field 38 stores a value indicating whether the name is according to the operating system naming convention or the record management system naming convention. The contents of the external reference label type field 38 thus provide information as to how the contents of the reference label field 37 are to be interpreted or processed.

The external reference vector item 34 also includes an external reference control flag 39. The referenced data structure may be a local data structure or a global data structure. As noted in the aforementioned Information Object Transport System Application, Ser. No. 07/368,681, a tabular data structure may be a global information object, that is, an information object whose names or other identification is unique across all nodes in distributed digital data processing system and which may be accessed by any program or application in any node in the system by reference to the same name or identification. A global information object may be replicated in the various nodes in the system so that each node includes a copy of the global information object, or alternatively, a global information object may be resident on a single node, and the other nodes may be able to retrieve a copy of it from the node on which it resides by reference to the name of the global information object. On the other hand, a tabular data structure 10 may comprise a local information object so that it may be accessed by name by an application only on the node in which the local information object resides. The reference control flag field 39 includes a flag whose condition indicates whether the referenced data structure is a local data structure or a global data structure.

As described above, the header portion 12 in the tabular data structure also includes a generic columns portion 26 that may contain columnar display and processing information for columns which may be contained in the tables stored in the table contents portion 13. The generic columns portion 26 may include one or more column information items 56, one of which is depicted in detail in FIG. 4, that a table in table contents portion 13 may reference to identify the columnar display and processing information. An application processing the tabular data structure 10 uses the column information in the item 56 in processing or printing the particular table in table contents portion 13 identifying the item 56.

With reference to FIG. 4, a generic columns item 56 includes one or more fields. A column name/identification field 40 may include a name or other identification for the column, which may be used in tables in table contents portion 13 to reference the generic columns item 56. A column application private data field 41 may store information private to the particular application that created the tabular data structure 10. A column formats field 42 stores default format information, identifying how a column is to be displayed or printed. A column computed-by field 43 may contain an expression defining how a value for the cells comprising the column is to be computed.

A generic columns item 56 may also include a column default value field 44, which may contain a default value to be used for cells in the column, if the values for the cells are not otherwise specified, and a column missing value field 45 may contain a value denoting a null or missing value for the cells comprising the column, if not otherwise specified. A column header field 46 may contain a text string which is used as a header for the column. A data type field 50 identifies the data type of the data in the cells comprising the column, that is, whether the data is integer or floating type and the precision, and a data length field 51 may identify the number of characters in the data in the cells comprising the column. A scale factor field 52 may identify any scaling of the data contained in the cells in the column, identifying, for example, the location of a decimal point in the data.

Finally, a generic columns item 56 may also include several flags, including an auto-recalculation flag 53 which, if set, indicates that expressions in the cells in the column are to be automatically recomputed whenever a change is made to a variable included in the expression. A read-only flag 54, if set, indicates that the data in the column may not be updated. An annotation flag 55, if set, indicates that the data in the column identifies labels for the rows in a table referencing the generic column 26, rather than data.

As described above, the table contents portion 13 may include one or more tables each defined by a table definition 59. The table definition 59 includes two portions, including a table header portion 60, which stores information concerning the table, and a table rows portion 66, described below in connection with FIG. 5D, which stores the actual table data. The table header portion 60 may include fields 61 and 62 which may contain values identifying, respectively, the maximum number of columns and rows which the table may contain. A private data field 63 contains information private to the application which created the tabular data structure 10. A table metadata field 64, which is described below in connection with FIG. 5B, contains metadata information describing the organization and structure of the table, and a windows field 65, which is described below in connection with FIG. 5C, contains windowing information defining the display-specific information for a table.

The table metadata field 64, which contains data that describes the organization and structure of the table, is depicted in FIG. 5B. With reference to FIG. 5B, the table metadata field 64 includes a table name/identification field 70 that identifies the table defined by table definition 59. A private information field 71 includes information for the particular table that is private to the application which created the table definition 59. A table description field may contain information such as the revision history of the table and restrictions on its use.

The table metadata field 64 may also contain a flags field 73 that, in turn, may contain a number of flags relating to the use and processing of the data contained in the table rows portion 66 of the table definition 59. For example, an auto-recalculation flag may control whether expressions in the cells in the table rows portion 66 are to be automatically recalculated if the data values referenced thereby are modified, and an auto-resort flag may control whether a sorting operation is to be performed automatically if the data values referenced thereby are modified. A flag may also identify whether calculations are to be performed by row, column or otherwise. In addition, a flag may identify whether the data contained in the table is to inherit formatting or display attributes based on precedence by row or column. This generally is applied to formatting by row or column when displayed or printed.

The table metadata field 64 may also contain a default formats field 74 which contains default formats for the rows and columns comprising the table defined by table definition 59, which defines default display or printing format information which may be used unless specific format information is provided in a table columns field 75 or in the table rows portion 66. The table columns field 75 has a structure similar to that of the generic columns field 26 described above in connection with FIG. 3, except that the table columns field 75 may also include a pointer (not shown) to a generic columns item 56 and a column position field (not shown) which identifies the position of the column relative to other columns in the table.

The table metadata field 64 may also include two additional fields. In particular, if values in selected cells are constrained to fall in particular ranges, that information may be inserted into a table ranges field 76. An application processing the tabular data structure 10 may use that information to verify than data values input into the cells are within the ranges specified in the table ranges field 76. Finally, a referenced symbols field 77 may contain a list of symbols which may be referenced in expressions in the contained in cells in the table rows portion 66 of the table definition 59. Symbols may comprise, for example, various mathematical operators which may be used in the particular expressions in the tables, and the expressions may reference the symbols by means of pointers thereto.

Figures 5C, 5D:
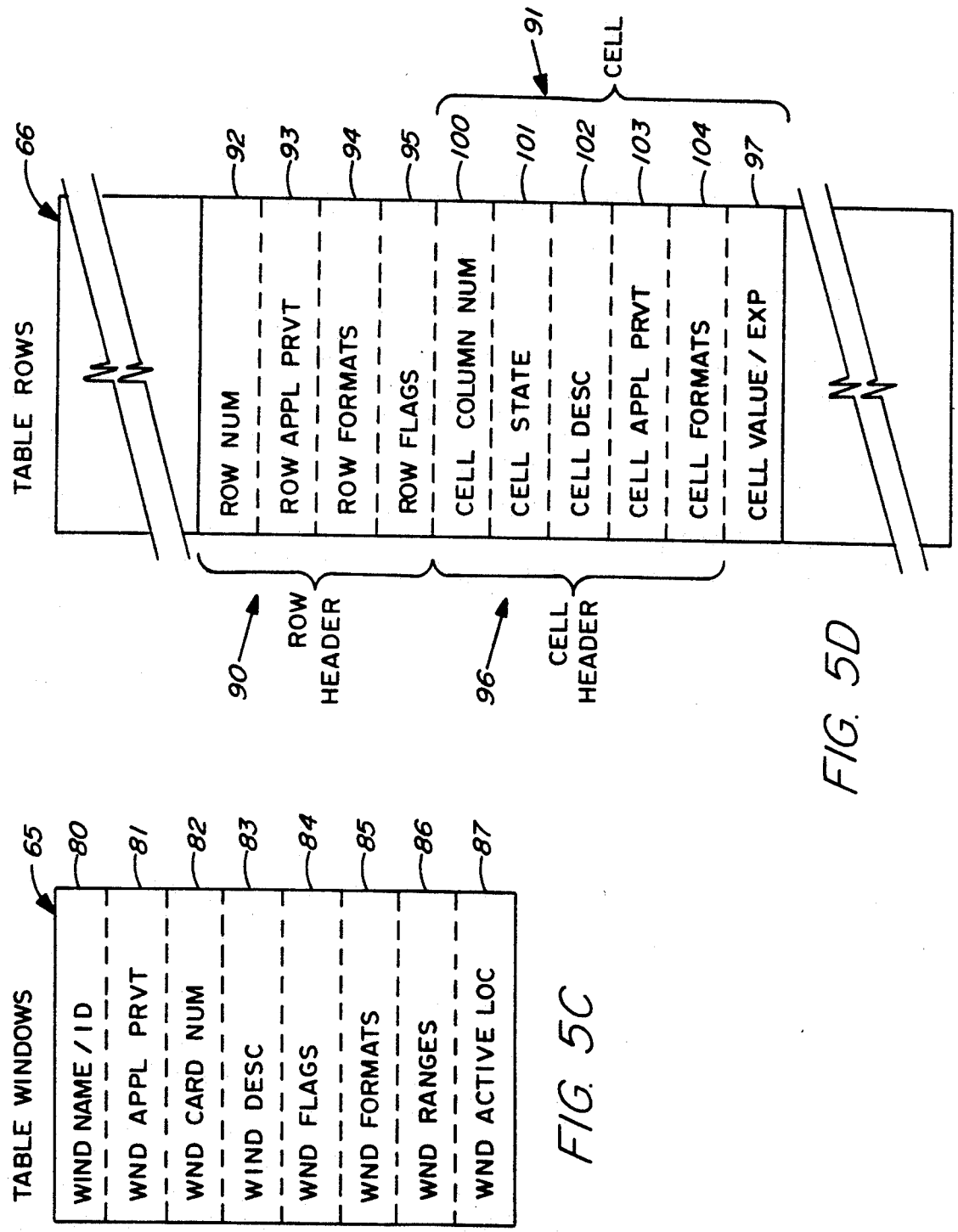

As described above, the table header 60 of a table definition 59 also may contain a table windows field 65 which describes how the data in the table is to be displayed. The table windows field 65 may define multiple windows, each of which indicates display column widths and format information, whether cells, which may contain titles, are locked in place and do not scroll, an active cell, and so forth. A table window 65 includes a number of fields depicted in FIG. 5C. With reference to FIG. 5C, a table window includes a window name/identification field 80 which may contain a name by which a user or application may reference the window. A window application private field 81 may contain information private to the particular application private field 81 may contain information private to the particular application that created the tabular data structure 10. The table windows which may be defined by the table definition 59 may be ordered in importance, or in a particular display order, defining an order in which, for example, a user can cycle through them for selected processing purposes, and a window cardinal number field 82 stores a value identifying the order of the table window 65.

The table windows field 65 may also contain a description field 83 which may contain a textual description of the window, which the user may reference to identify the window. A window flags field 84 may contain flags that indicate, for example, whether the window is to be active or hidden, that is, not displayed, whether formulas or values in the window are to be hidden or displayed, whether column or row headers are to be displayed, and whether grid lines outlining the particular cells of the tabular array are to be displayed.

A table windows field 65 may also contain additional fields. For example, a default formats field 85 may identify how the data is to be displayed for a window. A window ranges field 86 specifies information similar to that in the table ranges field 76 in table metadata field 64 (FIG. 5B), which is to be used when the data in the table rows portion 66 is displayed using the particular table window 65. Finally, a window active location field 87 identifies a particular active cell, that is, a particular cell in which a user can input data values, in the table rows portion 66 for the window.

As noted above, the table rows portion 66 (FIG. 5A) contains the actual data for the table defined by the table definition 59. The table rows portion 66 contains data encoded in a series of rows, a portion of one of which is depicted in FIG. 5D. With reference to FIG. 5D, a row in the table rows 66 includes a row header 90 followed by a series of cells 91, one cell being shown in FIG. 5D. The row header generally identifies the row and contains formatting and other information which may be used to control processing of cells contained in the row. In particular, the row header includes a row number field 92 which stores a value identifying the row in the series of rows contained in table rows 66. If a table definition does not have any data for a particular row in a table, there may be no row number field 92 which contains that row number, thereby facilitating packing of the data in the tabular data structure 10. The row number field 92 of a row may be omitted, in which case the row number of the row is a function of the row number of the preceding rows.

Following the row number field 92 in the row header 90, if present, or as the first field in the row header if the row number field 92 is not present, a row application private field 93 stores information which is private to the particular application that originated the tabular data structure 10. A row formats field 94 may contain formatting information for the particular row. If particular formatting information is provided in the row formats field 94, that formatting information supersedes and is used instead of conflicting formatting information which may be present in the window formats field 85 (FIG. 5C), default formats field 74 (FIG. 5B) or generic column information (FIG. 3) that may be pointed to by a columns field 75 (FIG. 5B). Finally, a row flags portion 95 may contain a flag indicating that the contents of the cells comprising the row are for display or annotation purposes, and do not constitute actual data.

Following the row header 90 in table rows portion 66 are the actual cells 91 comprising the row. A cell 91 includes a cell header portion 96, which also contains display and status information, and a cell value/expression field 97, which contains the literal value for the cell, and/or an expression by which the value for the cell can be computed. The cell header includes a cell column number field 100 which identifies the column of the cell; if a cell does not contain any data, a cell may not be present for that particular column, thereby further facilitating packing of the data in the tabular data structure 10. A cell state field 101 identifies the state of the cell, that is, whether the cell, and in particular the cell value/expression field 97, contains valid data.

The cell 91 may also contain a cell description field 102, which, if present, stores a textual description of the contents of the cell, which may be particularly useful if the value in the cell is defined by an expression in the cell value/expression field 97. A cell application private field 103 may store information private to the application which originated the tabular data structure 10, and a cell formats field 104 may contain information for formatting the value, whether literal or computed in response to an expression in the cell value/expression field 97, for the particular cell during display or printing of the tabular data structure 10. If particular formatting information is provided in the cell formats field 104, that formatting information supersedes and is used instead of conflicting formatting information which may be present in the row formats field 94, window formats field 85 (FIG. 5C), default formats field 74 (FIG. 5B) or generic column information (FIG. 3) that may be pointed to by a columns field 75 (FIG. 5B).

The tabular data structure 10 thus provides a data structure in which rows, as well as cells in each row, may be close packed, by use of the row identifies in row number field 92 and the cell column identifiers in the cell column number field 100. In addition, the tabular data structure 10 facilitates a processing and formatting hierarchy, by providing generic columns information in field 26 (FIG. 1) which may be referenced by the particular table columns 75 for the respective tables. In addition, each table, row and cell may also include formatting information for the particular row and cell.

Figure 6:
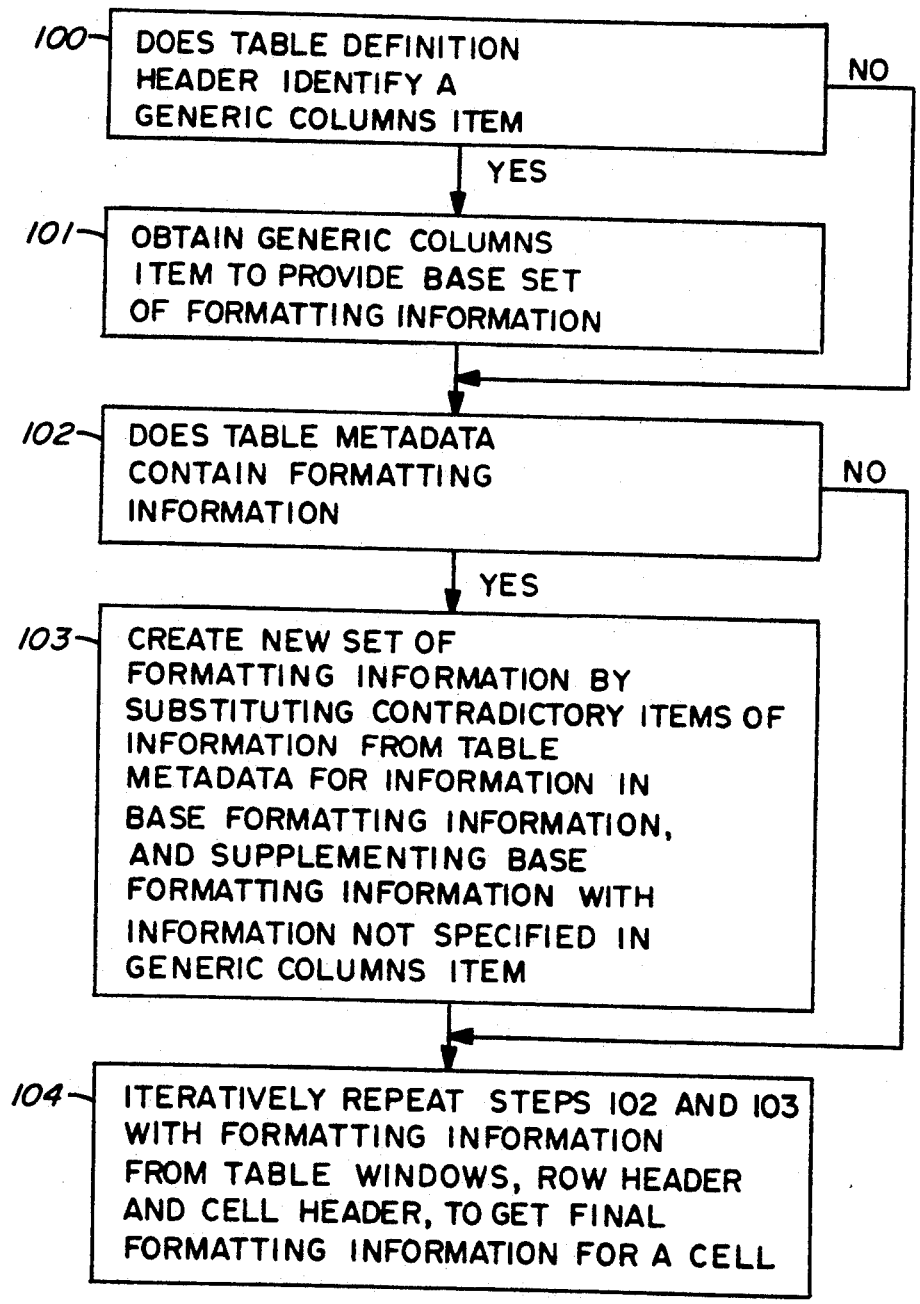
FIG. 6 depicts a flow chart illustrating a selected processing operation in connection with the tabular data structure.
Figure 7:
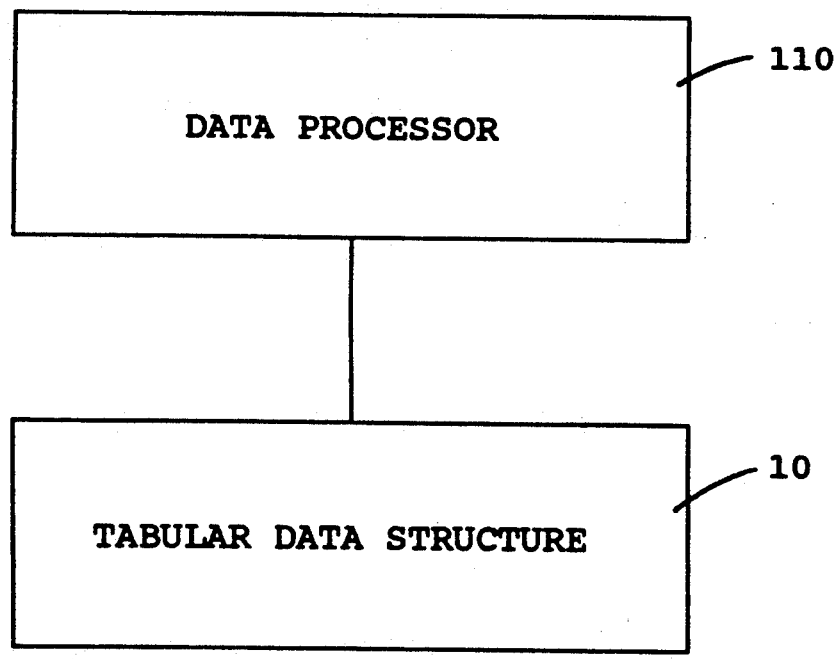
FIG. 7 depicts a data processor operating upon data from the tabular data structure in accordance with the invention.

FIG. 6 depicts a flow chart illustrating a processing operation using the tabular data structure 10, illustrating the use of the diverse formatting information in the various portions of the tabular data structure 10. A processor (not shown), which processing a table definition for, for example, display or printing, initially determines whether the header 60 of a table definition contains a reference to one or more items 56 in the generic columns field 26 (step 100). If so, it obtains the item 56 and uses them as base sets of formatting information for identified columns when displaying or printing the table.

Following step 101, or step 100 if the processor determines that the table header does not contain a reference to a generic columns item 56, the processor determines whether the table metadata field 64 contains formatting information for the various columns of the table (step 102). If so, the processor creates a new set of formatting information for the columns by substituting contradictory formatting information from the table metadata field 64 for the information, if any, from the identified generic columns items 56, and by supplementing it with the information that was not specified in the generic columns item 56 (step 103). Thus, the formatting information for a column, at the end of step 103, comprises the set of formatting information items in the generic columns item 56, if any, referenced by the table definition header 60, to the extent they are not inconsistent with specific formatting information items in the table metadata field 64, plus the formatting information items in the table metadata field 64, if any. The processor then effectively repeats steps 102 and 103 with formatting information from the table windows field 65, the row header 90, and the cell header 96 to obtain the final or composite formatting information for data in a cell.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A data processing system comprising:
   a memory containing data and control information; and
   a data processor for processing said data in accordance with said control information;
   wherein said data and said control information include:
   cell data items including cell data for respective cells of a table of rows and columns of said cells;
   a table attribute entry including table control information specifying a format for the cell data of cells in the table;
   a window attribute entry including window control information specifying a format for cell data of cells in a window portion of the table;
   a plurality of column attribute entries including column control information specifying a format for cell data for cells in respective columns of the table;
   a plurality of row attribute entries including row control information specifying a format for cell data for cells in respective rows of the table; and
   a plurality of cell attribute entries including cell control information specifying a format for cell data for respective cells of the table;
   wherein said data processor includes:
   means for retrieving table control information from the table attribute entry,
   means for retrieving window control information from the window attribute entry and deriving window formatting information from the retrieved table control information by substituting the retrieved window control information when the retrieved window control information contradicts the retrieved table control information and by supplementing the retrieved table control information with the retrieved window control information when the retrieved window control information is not specified by the retrieved table control information,
   means for retrieving column control information from column attribute entries of columns in the window portion of the table and deriving column formatting information for each of said columns in the window portion of the table from the retrieved window formatting information by substituting the retrieved column control information when the retrieved column control information contradicts the window formatting information and by supplementing the window formatting information with the retrieved column control information when the retrieved column control information is not specified by the window formatting information,
   means for retrieving row control information from row attribute entries of rows in the window portion of the table and deriving row formatting information for each of said rows in the window portion of the table from the column formatting information by substituting the retrieved row control information when the retrieved row control information contradicts the column formatting information and by supplementing the column formatting information with the retrieved row control information when the retrieved row control information is not specified by the column formatting information, and
   means for retrieving cell control information from cell attribute entries of cells in the window portion of the table and deriving cell formatting information for each of said cells in said each of said rows in the window portion of the table from the row formatting information for said each of said rows in the window portion of the table by substituting the retrieved cell control information when the cell control information contradicts the row formatting information and by supplementing the row formatting information with the retrieved cell control information when the retrieved cell control information is not specified by the row formatting information; and
   means for formatting the cell data item for said each of said cells in said each of said rows in the window portion of the table according to said cell formatting information for said each of said cells in said each of said rows in the window portion of the table.

2. The data processing system as claimed in claim 1, wherein each row attribute entry is included in a respective row header in said memory, and said row header also includes a row number identifying a respective row of the table, wherein said each row attribute entry includes row attribute information specifying a format for cell data for at least one cell in said respective row of the table.

3. The data processing system as claimed in claim 1, wherein said data and control information in said memory includes a cell header preceding each cell data item in said memory, and the cell header includes a cell number identifying a respective column of the table, wherein said each cell data item includes cell data for a respective cell in said respective column of the table.

4. The data processing system as claimed in claim 1, wherein said data and control information in said memory further includes a descriptor portion having a format version identification field specifying a format version, a product identification field that specifies an application program that created said control information, and a product name field including a human-readable identifier for said application program that created said control information.

5. The data processing system as claimed in claim 1, wherein said table control information in said memory includes a header portion having an external references vector, and said external references vector includes a plurality of vector reference elements, and each of said vector reference elements includes an external reference data type field identifying a data type of information specified by an externally referenced element, an external reference descriptor field including a human-readable description of said data type of said information specified by said externally referenced element, an external reference label field identifying a name of said externally referenced element, an external reference label type field indicating whether said name of said externally referenced element is according to an operating system naming convention or a record management system naming convention, and a reference control flag indicating whether or not said externally referenced element is local to said data processor and thereby accessible by name by an application program only when said application program is executed by said data processor.

6. The data processing system as claimed in claim 1, wherein said data and control information further include a plurality of generic column entries, each of said generic column entries including column control information specifying a format for cell data for cells in a plurality of said columns, and the column attribute entries including column control information specifying a format for cell data for cells in said plurality of columns each include a pointer to said each of said generic column entries, and wherein said means for retrieving the column control information includes means for retrieving said pointer and using said pointer to retrieve the column control information in said each of said generic column entries.

7. The data processing system as claimed in claim 6, wherein said table attribute entry includes a pointer to one of said generic column entries, and said means for retrieving table control information from the table attribute entry includes means for retrieving said pointer to one of said generic column entries and using said pointer to one of said generic column entries to retrieve the column control information in said one of said generic column entries.

8. The data processing system as claimed in claim 1, wherein the attribute entries are arranged in an ordered sequence in said memory such that the table attribute entry is first, followed by the column attribute entries, followed by the window attribute entry, followed by the row attribute entries.

9. The data processing system as claimed in claim 8, wherein the cell data items are arranged in said memory so that the cell data items including cell data for cells in a respective row immediately follow the row attribute entry including row control information for the respective row.

10. The data processing system as claimed in claim 1, wherein said table control information in said memory includes a header having a language identification field identifying at least one natural language of text contained in said memory, and said processor includes means for controlling processing of said data in said memory in accordance with said one natural language identified in said language identification field.

11. The data processing system as claimed in claim 10, wherein said language identification field contains a list of a plurality of natural languages, and said header includes a language preference table field, and said language preference table field contains a plurality of language preference items, and each of said language preference items includes a pointer into said list of natural languages to thereby associate each of said language preference items with an associated one of said plurality of natural languages.

12. The data processing system as claimed in claim 11, wherein each of said language preference items further includes a currency symbol indicator indicating where a currency symbol for said associated one of said plurality of natural languages is located in relation to a currency value, and an indicator of where digit separators are located for said associated one of said plurality of natural languages.

13. The data processing system as claimed in claim 11, wherein at least one of said language preference items further includes a language edit strings field specifying how money and telephone numbers are formatted for the natural language associated with said one of said language preference items.

14. A data processing system comprising:
a memory containing data and control information; and
a data processor for processing said data in accordance with said control information;
wherein said data and said control information include:
cell data items including cell data for respective cells of a table of rows and columns of said cells; and
a table attribute entry including table control information specifying a format for the cell data of said cells; and
a plurality of cell attribute entries including cell control information specifying a format for cell data for respective cells of the table;
wherein said data processor includes:
means for retrieving table control information from the table attribute entry, and
means for retrieving cell control information from cell attribute entries of said respective cells of the table and deriving cell formatting information for each of said respective cells of said table from the table control information by substituting the retrieved cell control information when the cell control information contradicts the table control information and by supplementing the table control information with the retrieved cell control information when the retrieved cell control information is not specified by the table control information; and
means for formatting the cell data item for said each of said respective cells according to said cell formatting information for each of said respective cells,
wherein said table control information in said memory includes a header having a language identification field identifying at least one natural language of text contained in said memory, and said processor includes means for controlling processing of said data in said memory in accordance with said one natural language identified in said language identification field.

15. The data processing system as claimed in claim 14, wherein said means for controlling processing of said data in said memory in accordance with said one natural language includes means for sorting data in accordance with a language collating sequence.

16. The data processing system as claimed in claim 14, wherein said data in said memory includes currency values and said means for controlling processing of said data in said memory in accordance with said one natural language includes means for processing said currency values in accordance with currency denominations of said one natural language.

17. The data processing system as claimed in claim 14, wherein said language identification field contains a list of a plurality of natural languages, and said header includes a language preference table field, and said language preference table field contains a plurality of language preference items, and each of said language preference items includes a pointer into said list of natural languages to thereby associate each of said language preference items with an associated one of said plurality of natural languages.

18. The data processing system as claimed in claim 17, wherein each of said language preference items further includes a currency symbol indicator indicating where a currency symbol for said associated one of said plurality of natural languages is located in relation to a currency value, and an indicator of where digit separators are located for said associated one of said plurality of natural languages.

19. The data processing system as claimed in claim 18, wherein at least one of said language preference items further includes a language edit strings field specifying how money and telephone numbers are formatted for the natural language associated with said one of said language preference items.

20. A data processing system comprising:
a memory containing data and control information; and
a data processor for processing said data in accordance with said control information;
wherein said data and said control information include:
cell data items including cell data for respective cells of a table of rows and columns of said cells; and
a table attribute entry including table control information specifying a format for the cell data of said cells; and
a plurality of cell attribute entries including cell control information specifying a format for cell data for respective cells of the table;
wherein said data processor includes:
means for retrieving table control information from the table attribute entry, and
means for retrieving cell control information from cell attribute entries of said respective cells of the table and deriving cell formatting information for each of said respective cells of said table from the table control information by substituting the retrieved cell control information when the cell control information contradicts the table control information and by supplementing the table control information with the retrieved cell control information when the retrieved cell control information is not specified by the table control information; and
means for formatting the cell data item for said each of said respective cells according to said cell formatting information for each of said respective cells,
wherein said table control information in said memory includes a header portion having an external references vector, and said external references vector includes a plurality of vector reference elements, and each of said vector reference elements includes an external reference data type field identifying a data type of information specified by an externally referenced element, an external reference descriptor field including a human-readable description of said data type of said information specified by said externally referenced element, an external reference label field identifying a name of said externally referenced element, an external reference label type field indicating whether said name of said externally referenced element is according to an operating system naming convention or a record management system naming convention, and a reference control flag indicating whether or not said externally referenced element is local to said data processor and thereby accessible by name by an application program only when said application program is executed by said data processor.

* * * * *